Jan. 12, 1971 D. BUDNICK 3,555,421

METHOD AND APPARATUS FOR COMPARING TWO PULSE SEQUENCES OF DIFFERENT FREQUENCIES

Filed Oct. 7, 1968 2 Sheets-Sheet 1

Jan. 12, 1971 D. BUDNICK 3,555,421
METHOD AND APPARATUS FOR COMPARING TWO PULSE SEQUENCES
OF DIFFERENT FREQUENCIES
Filed Oct. 7, 1968 2 Sheets-Sheet 2

United States Patent Office 3,555,421

Patented Jan. 12, 1971

3,555,421

METHOD AND APPARATUS FOR COMPARING TWO PULSE SEQUENCES OF DIFFERENT FREQUENCIES

Diethard Budnick, Ludwigsburg, Wurttemberg, Germany, assignor to Carl Zeiss-Stiftung, Oberkochen, Wurttemberg, Germany, a corporation of Germany Filed Oct. 7, 1968, Ser. No. 765,610

Claims priority, application Germany, Oct. 6, 1967, 1,537,218

Int. Cl. G01p *3/56*

U.S. Cl. 324—161 10 Claims

ABSTRACT OF THE DISCLOSURE

Two signal pulse sequences having different predetermined mean frequencies in a predetermined mean ratio are compared respectively with two reference pulse sequences, which have said mean frequencies in said ratio, to produce two sets of deviation signals respectively proportional in magnitude to the phase differences between the respective signal and reference pulse sequences. The sets of deviation signals are then combined to produce resultant signals proportional to the combined relative deviations of both signal pulse sequences from said mean frequencies.

This invention relates to a method and a device for comparing two pulse sequences having different frequencies, with predetermined mean frequencies which are in a predetermined ratio, one to the other.

In a known method and a device for comparing two pulse sequences with different frequencies, the sequences of signal pulses are supplied to a comparator which sends out signals proportional to the position deviations of the signal pulse sequences, and the frequency of the signal pulse sequences is varied by division and/or multiplication before being supplied to the comparator. For the frequency multiplication a controlled oscillator and a frequency divider are used, the divided frequency being compared with the signal frequency and a control voltage being obtained from the comparison for tuning the oscillator. This method and device, however, have the disadvantage that the electric frequency multiplication is faulty because, for satisfactory interpolation of an interval, its length must be known, but its length has not been established at the beginning of the multiplication. Therefore the multiplication can orient itself only according to the preceding pulse spacing, and errors occur in the interpolation as soon as a deviation occurs in the spacings of successive pulses. The errors are particularly great if the pulse spacing varies rapidly. Consequently, this known method and device are suitable only in situations in which the frequency of one of the pulse sequences is predetermined and remains constant.

Another circuit arrangement for comparing the number of pulses of two pulse sequences utilizes an auxiliary oscillator. In this arrangement the pulses of the auxiliary oscillator serve to produce secondary pulses which are derived from the signal pulses and which are suitable directly for evaluation in forward-backward counters. This is achieved by feeding the secondary pulses derived from the auxiliary oscillator into the two counters at respectively displaced times to produce correspondingly staggered pulses, even if the signal pulses of the two pulse sequences concide in time. Since only the number of signal pulses, or the difference between the number of pulses in the two counters—not their mutual position—is of importance for the result, it is possible to count without error the derived secondary pulses rather than the signal pulses.

A principal object of the present invention is to provide a method and a device wherein two sequences of pulses having different frequencies are compared with one another without delay and without error even at rapidly varying pulse frequencies, when the ratio of the frequencies of the pulses in the sequences vary only over a small range, so that signals proportional to the deviations of the frequencies of the signal pulses are transmitted.

In accordance with the invention each signal pulse sequence is fed to a separate phase comparator on each of which is imposed a reference pulse sequence which is produced in the ratio of the signal pulse sequences by a comparison system. The phase comparators supply the position deviations between the signal pulse sequence and the respective reference pulse sequences to a difference former which transmits signals proportional to the relative deviations of the two signal pulse sequences.

The device of this invention includes a conventional oscillator for producing an adjustable fundamental frequency, and two conventional frequency dividers connected after the oscillator. The ratio of division of the frequency dividers is adjusted in accordance with the frequency ratio of the signal pulse sequences and as a function of the fundamental frequency sequence, and the fundamental frequency of the oscillator is controllable to be a function of the frequency of one of the two phase comparators.

The method and the device of this invention is particularly adapted for measuring, controlling, and/or regulating the relative path or angle deviations of two moving parts, such as the carriage and spindle of a machine tool, the velocities of movement of which are in a predetermined range of ratios. The movement of the subject parts, however, may be either translatory or rotary.

In operation a scale mounted on one of the moving parts is scanned in a conventional manner for producing a sequence of signal pulses. Then, in accordance with the invention, the position deviation between signal and reference pulse sequences is determined by the length of the partial intervals between the two pulse sequences by counting the lengths of the partial intervals in units of the fundamental sequence of the oscillator by digital means.

The method and device of this invention will now be described in detail with reference to an exemplary embodiment illustrated in the accompanying drawings in which.

Figure 1:
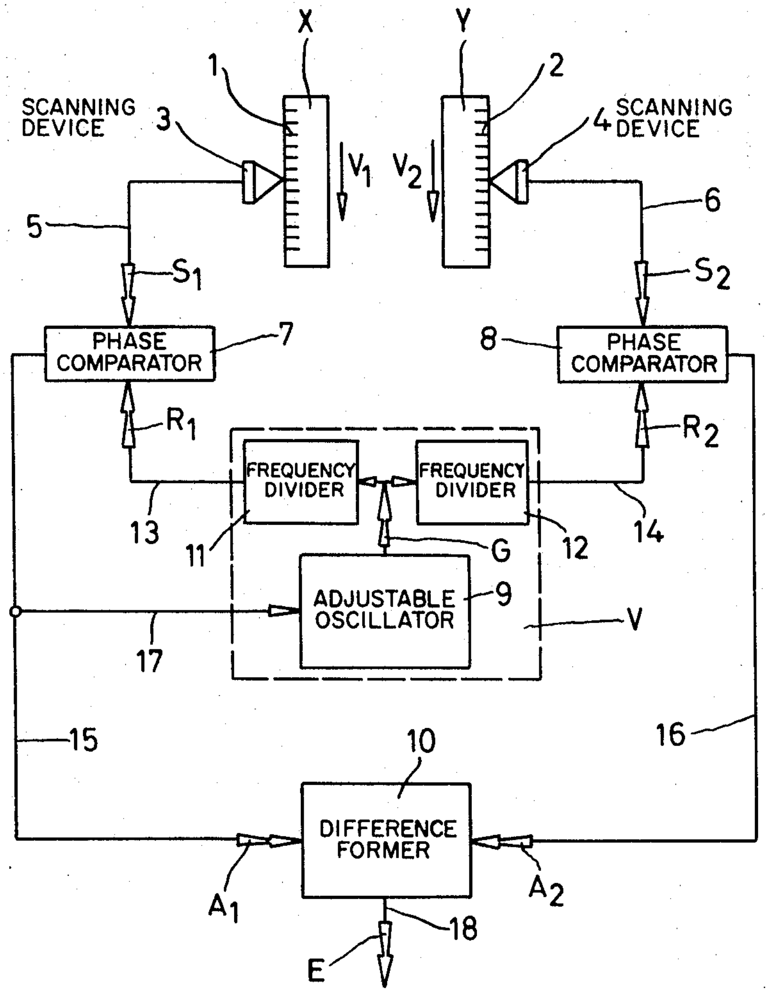
FIG. 1 is a schematic representation of a device embodying the invention.

In FIG. 1 two parts X and Y move linearly at velocities $v1$ and $v2$ and are provided with scales 1 and 2, which are subdivided optically, magnetically, or otherwise. Scanning devices 1 and 2 scan the scales 3 and 4 and provide signal pulse sequences S1 and S2, which are fed to a phase comparator 7 or 8 by conductors 5 and 6.

For a given desired ratio of velocity $v1$ to velocity $v2$ the signal pulse sequences S1 and S2 have a fixed mean frequency ratio which is determined by the selection of the lattice constants of the scales 1 and 2 and by the velocities $v1$ and $v2$. The velocities, from which signal pulse sequences are produced for comparison in accordance with the present invention, may be the velocities of two translatory or two rotary movements or a translatory and a rotary motion.

The predetermined mean frequency ratio of the signal pulse sequences S1 and S2 is reproduced by a comparison system V which consists of a conventional adjustable oscillator 9 and two conventional frequency dividers 11 and 12. The oscillator 9 transmits a relatively high fundamental frequency G which is divided by the frequency dividers 11 and 12 to produce reference pulse sequences R1 and R2 in a ratio corresponding to the aforesaid predetermined mean ratio of signal pulse sequence S1 to signal pulse sequences S2. The frequency dividers 11 and 12 are preferably adapted to produce digital signals which permit partial factors to be preset easily, thereby providing a frequency-independent and phase-rigid comparison system V which is substantially error-free.

The reference pulse sequences R1, R2 are conducted through lines 13 and 14 to the phase comparators 7 and 8, which preferably operate with a linear interpolation method, and which determine the deviations of signal pulse sequences S1 and S2 from the reference pulse sequences R1 and R2. These deviations are reproductions of the deviations of the ratio of the velocity of the part X to the velocity of part Y from a predetermined mean ratio.

When the signal pulse sequences S1 or S2 deviate from the reference pulse sequences R1 and R2, the phase comparators 7 and 8 produce deviation signals A1 and A2 proportional to the magnitudes of the deviations. These deviation signals A1 and A2 may be analog voltages as well as combinations of signals coded in the binary system or otherwise. They pass over lines 15, 16 to a difference former 10, in which a subtraction of the deviation signals A1 and A2 is effected to produce a signal E corresponding to the magnitude of the difference and to the direction of the difference. The output of the difference former 10 passes therefrom over an output line 18. If the deviation signals A1 and A2 are equal in the same direction, they cancel out and no signal E is produced. A signal E produced by the difference former 10 is therefore proportional to the relative deviation of the translatory movements of parts X and Y, and it may be an analog voltage or a combination of signals coded in the binary system or otherwise. In this form a signal E is suitable for the direct recording of the error pattern or for the printing out or storing thereof in an electronic data processing system.

The oscillator 9 of the comparison system V is suitably a conventional, commercially available voltage- or current-controlled oscillator that is constructed so that its fundamental frequency G can be tuned. For tuning, a manipulatable variable is provided for in the configuration of the oscillator, and in the device of this invention the power for this variable is taken from one of the phase comparators 7 or 8, and preferably from the one expected to produce the smallest deviation signal (A1 or A2). In FIG. 1 power for the variable is illustrated as being conducted to the oscillator 9 through a control line 17 which is connected into the line 15 between phase comparator 7 and the difference former 10.

Figure 2:
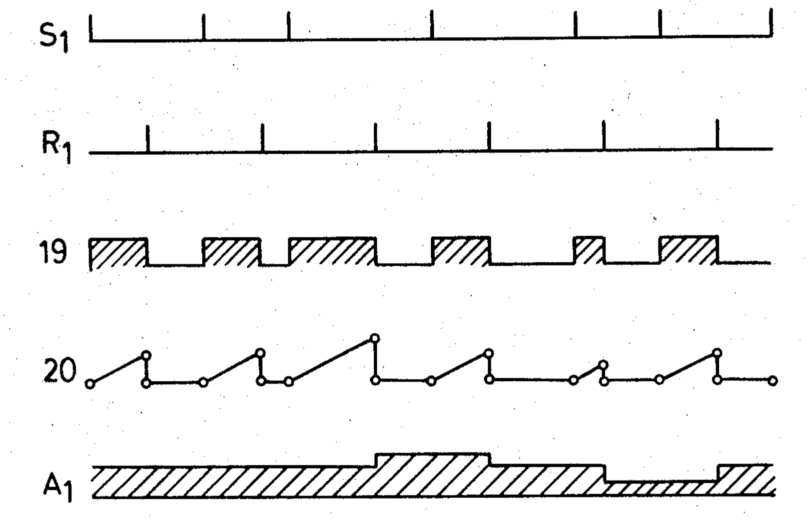
FIG. 2 is a diagram of a pulse scheme for the phase comparison by means of linear interpolation.

FIG. 2 illustrates a pulse scheme for the position comparison of two pulse sequences by means of linear interpolation. The signal pulse sequence S1 and the reference pulse sequence R1, which are represented by the first two lines in FIG. 2, are converted into a rectangular pulse sequence 19, represented in the third line, the conversion being suitably effected by a conventional bistable flip-flop stage. As indicated, the pulses of the signal pulse sequence S1 define the leading edges of the rectangular pulses of sequence 19, and the pulses of the reference pulse sequence R1 define the trailing edges thereof. The lengths of these rectangular pulses are thus proportional to the phase differences between the signal and reference pulses and hence represent the position deviation of the two pulse sequences S1 and R1. The fourth line represents the integration 20 of the rectangular pulse sequence 19 and, as shown, the integral values, which are proportional to the particular pulse lengths, are accumulated for the lengths of the pulses so as to produce an output signal A1 in the form of a stepped curve, as represented in the bottom line. An analogous integration and accumulation of the integral values can be effected by known techniques using operation amplifiers arranged in circuit configurations which are known in the art.

Figure 3:
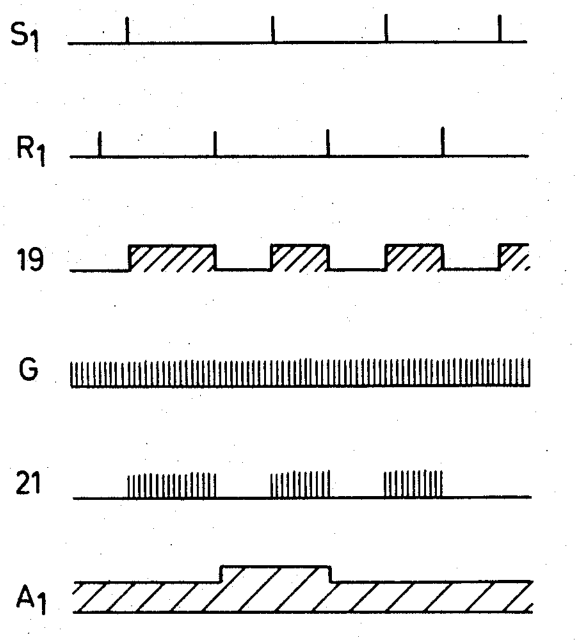
FIG. 3 is a diagram of a pulse scheme for digital phase comparison.

FIG. 3, like FIG. 2, illustrates the production of a rectangular pulse sequence 19 from the signal pulse sequence S1 and the reference pulse sequence R1. In FIG. 3, however, the fourth line represents the pulse sequence of the fundamental frequency G in digital form, and the rectangular pulse sequence 19 (line 3) is utilized to count out, with a conventional counting device, pulses 21 whose number and lengths correspond to the number total number of pulses of the fundamental frequency and length of the rectangular pulse sequence 19. The G per measuring interval is known and equals the sum of the partial factors of the frequency dividers 11 and 12. Consequently, the signal A1, for example, is a numerical representation of the phase differences and the position deviations between the signal pulse sequence S1 and the reference pulse sequence R1. The numerical values of these phase differences can be accumulated, in the manner described with reference to FIG. 2 above, for the durations of the pulses and can be given out in coded form, or, by using a digital-analog converter as analog signal A1, they can be given out in the form of a stepped curve as illustrated in the bottom line.

The counter, accumulating means, and digital-analog converter, referred to above, are components in many digital measuring devices and their elements and circuit configurations are well known in the art.

What is claimed is:

1. A method of comparing the instantaneous mutual frequency and phase relation of two signal pulse sequences having predetermined, different mean frequencies, respectively, the means frequencies being a predetermined ratio one to the other, comprising: generating two phase-locked reference pulse sequences, respectively, having said mean frequencies in said predetermined ratio, applying each signal pulse sequence and the reference pulse sequence which has the same mean frequency as the signal pulse sequence, respectively, to two phase comparators to produce two sets of deviation signals proportional to the magnitude of the instantaneous phase differences between the pulses of the respective signal and reference sequences, and combining the two sets of deviation signals by subtracting one from the other to produce resultant signals proportional to the relative differences between the deviation signals of the two sets, whereby said resultant signals equal the combined deviations of both signal pulse sequences from said predetermined means frequencies.

2. The method of claim 1 in which the deviation signals are produced by interpolating the signal pulse sequences and the respective pulse sequences, which have the same mean frequencies as the signal pulse sequencies, to produce sequences of rectangular pulses, said rectangular pulses having their leading edges defined respectively by the pulses of said signal pulse sequences and their trailing edges defined by the pulses of said reference pulse sequences so that the lengths of the rectangular pulses are proportional to phase differences between the signal pulse sequences and the reference pulse sequences, in which said rectangular pulses are integrated to product integral values proportional to lengths of the rectangular pulses, and in which the integral values are accumulated for the duration of each pulse for producing a deviation signal in the form of a stepped curve.

3. The method of claim 1 in which the deviation signals are analog signals.

4. The method of claim 1 in which the deviation signals are digital signals.

5. The method of claim 1 in which said said reference pulse sequences are produced by: generating oscillations adapted for having divided out from them two phase-locked reference pulse sequences which have the means frequencies of the signal pulse sequences, respectively, with the frequencies of the reference pulse sequences being in a ratio corresponding to said predetermined ratio of the frequencies of the signal pulse sequences, and dividing out said reference pulse sequences.

6. The method of claim 5 in which the frequency of said oscillations is tuned by application of variable control power drawn from one of said phase comparators.

7. The method of claim 1 applied for comparing the velocities of two moving elements, which method includes mounting scales on the elements, and scanning the scales for producing a signal pulse sequence for each element having a frequency proportional to the velocity of said element.

8. A device for comparing the instantaneous mutual frequency and phase relation of two signal pulse sequences having different frequencies, each of which has a predetermined means frequency and which are in a predetermined ratio, said device comprising: means generating two phase-locked reference pulse sequences respectively having said mean frequencies in said predetermined ratio, two phase comparators receiving and comparing the signal pulse sequences and the reference pulse sequences, which have the same mean frequencies as the signal pulse sequences, respectively, and producing two sets of deviation signals proportional to the magnitude of the instantaneous phase differences between the pulses of the respective signal and reference sequences, and difference former means receiving said sets of deviation signals and subtracting one set from the other for producing resultant signals proportional to the combined relative deviations of both signal pulse sequences from said mean frequencies.

9. The device of claim 8 in which said means for generating said two reference pulse signals comprises an oscillator generating pulses at a frequency adapted for having divided out therefrom two phase-locked references pulse sequences which have the mean frequencies of the signal pulse sequences, in the same ratio as the frequencies of the signal pulse sequences, and two frequency dividers respectively dividing out pulses from the oscillator into said two reference pulse sequences.

10. The device of claim 9 in which said oscillator includes manipulatable means for tuning the frequency of its pulses.

References Cited

UNITED STATES PATENTS 3,064,173 11/1962 Breen ............. 318—329

MICHAEL J. LYNCH, Primary Examiner

U.S. Cl. X.R.

324—82; 317—6